United States Patent [19]

Buxbaum et al.

[11] 4,104,297

[45] Aug. 1, 1978

[54] THERMOPLASTIC POLYESTERS PREPARED FROM DICARBOXYLIC ACIDS CONTAINING N-HETEROCYCLIC RINGS

[75] Inventors: Lothar Buxbaum; Thomas Kainmüller, both of Lindenfels, Odenwald, Fed. Rep. of Germany; Jürgen Habermeier, Pfeffingen, Switzerland

[73] Assignee: Ciba-Geigy Corporation, Ardsley, N.Y.

[21] Appl. No.: 794,692

[22] Filed: May 6, 1977

[30] Foreign Application Priority Data

May 12, 1976 [CH] Switzerland ............... 5935/76

[51] Int. Cl.$^2$ ............................................. C08G 63/68
[52] U.S. Cl. ................................. 528/289; 260/37 N; 428/480; 528/302; 528/305; 528/307
[58] Field of Search .................. 260/47 CZ, 75 N, 49

[56] References Cited

U.S. PATENT DOCUMENTS

| 3,542,731 | 11/1970 | Culbertson | 260/47 |
| 3,763,901 | 10/1973 | Crescenzi et al. | 260/47 CZ |
| 3,910,860 | 10/1975 | Tanikella | 260/76 |
| 3,925,310 | 12/1975 | Wolf et al. | 260/47 CZ |

*Primary Examiner*—Lester L. Lee
*Attorney, Agent, or Firm*—Luther A. R. Hall

[57] ABSTRACT

Thermoplastic polyesters based on aromatic diols are flexible, possess good working properties and have a high glass transition temperature when they contain dicarboxylic acids having N,N-heterocyclic rings.

15 Claims, No Drawings

THERMOPLASTIC POLYESTERS PREPARED FROM DICARBOXYLIC ACIDS CONTAINING N-HETEROCYCLIC RINGS

The present invention relates to linear thermoplastic polyesters formed from dicarboxylic acids, which contain N,N-heterocyclic rings, and aromatic diols, and optionally aliphatic and/or aromatic dicarboxylic acids and/or aliphatic or cycloaliphatic diols.

Thermoplastic polyesters formed from dicarboxylic acids and aromatic diols are known, e.g. polyesters from aliphatic and/or aromatic dicarboxylic acids and aromatic diols, which can also contain aliphatic diols. They are described, e.g., in the U.S. Pat. Nos. 3,351,624, 3,317,464, 3,297,633, 3,471,441 and 3,398,120 and in the German Offenlegungsschrift No. 2,438,053. A great disadvantage of these polyesters is their relatively high combustibility and frequently their poor processing characteristics on account of high softening temperatures and high melt viscosities, factors which necessitate processing temperatures which can be at the limit of the thermostability of the polyesters. The last-mentioned applies particularly to the polyesters formed from phthalic acids and bisphenols. Furthermore, these polyesters do not have sufficient flexibility for many desired applications.

The object of the present invention is to provide thermoplastic polyesters based on aromatic diols, which by virtue of the selection of specific dicarboxylic acids are less combustible with, at the same time, high glass transition temperatures and good processing characteristics being ensured or higher flexibility together with good performance characteristics and good working properties being imparted to the polyesters.

The present invention has as its subject matter linear thermoplastic polyesters formed from dicarboxylic acids, aromatic diols and, optionally, aliphatic or cycloaliphatic diols, with a relative viscosity of 1.1 to 3.5, measured on a solution of 1 g of polyester in 100 ml of a solvent consisting of equal parts of phenol and symmetrical tetrachloroethane at 30° C. They are characterised in that they comprise, relative to the polyester:

(a) 1 to 50 mol % of radicals of at least one dicarboxylic acid of the general formula

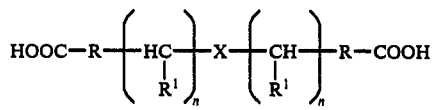
(I)

wherein $R^1$ s each represent a hydrogen atom or alkyl having 1 to 10 C atoms, R represents phenylene or alkylene having 1 to 17 C atoms, and X represents a heterocyclic radical of the following formulae IIa – IIg, and n represents the number 1 and for the radical of the formula IIg also 0,

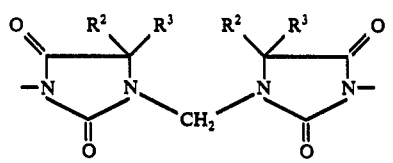
(IIa),

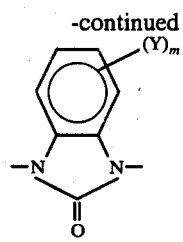
(IIb),

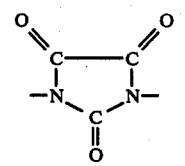
(IIc),

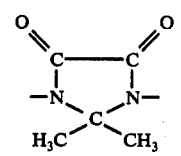
(IId),

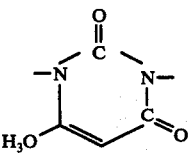
(IIe),

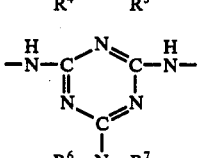
(IIf),

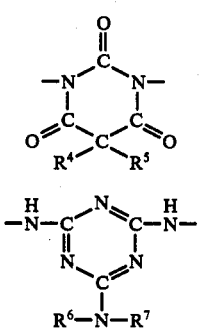
(IIg)

wherein $R^2$ represents a hydrogen atom, methyl or ethyl, $R^3$ represents methyl, ethyl, propyl or isopropyl, $R^4$ and $R^5$ each represent methyl, ethyl or phenyl, $R^6$ and $R^7$ each represent alkyl having 1 to 6 C atoms, cyclohexyl or phenyl, Y represents a bromine or chlorine atom, and m equals naught or represents a number from 1 to 4;

(b) 49 to 0 mol % of radicals of at least one aromatic and/or aliphatic or cycloaliphatic dicarboxylic acid;

(c) 20 to 50 mol % of radicals of an aromatic diol; and (d) 30 to 0 mol % of radicals of an aliphatic or cycloaliphatic diol.

Preferably the polyester (a) consists of 10 to 50, particularly 40 to 50, mol % of dicarboxylic acid radicals of the formula I; (b) 40 to 0, particularly 10 to 0, mol % of aliphatic and/or aromatic dicarboxylic acid radicals; (c) 30 to 50, particularly 40 to 50, mol % of aromatic diol radicals; and (d) 20 to 0, particularly 10 to 0, mol % of radicals of an aliphatic or cycloaliphatic diol.

If X in the formula I is a radical of the formula IIg, then preferably n is 0 and R is phenylene, or n is 1 and R is alkylene.

Also preferably, X in the formula I is a radical of the formulae IIa to IId, $R^1$ is a hydrogen atom, and R is linear alkylene having 1 to 4 C atoms or p-phenylene.

In a preferred subgroup of the polyesters, $R^1$ in the formula I is a hydrogen atom, $n$ is 1, R is p-phenylene, and X is a radical of the formulae IIa to IIf; or $n$ is 0, X is a radical of the formula IIg, $R^1$ is a hydrogen atom, and R is phenylene, methylene or ethylene.

In the formula IIb, $m$ is preferably 0 or the number 4.

Preferably, $R^2$ in the formula IIa is methyl and $R^3$ methyl or ethyl; $R^4$ as well as $R^5$ in formula IIf is methyl or ethyl; and $R^6$ as well as $R^7$ in formula IIg is phenyl or alkyl having 1 to 4 C atoms. In particular, $R^6$ and $R^7$ are ethyl or phenyl.

A further preferred subgroup comprises those polyesters in which, in the dicarboxylic acids of the formula I, $R^1$ is alkyl having 1 to 10 C atoms or in particular a hydrogen atom, $n$ is 1, and R is alkylene having 2 to 17, especially 2 to 4, C atoms.

Examples of $R^1$ as alkyl are methyl, ethyl, propyl, n-butyl, i-butyl, pentyl, hexyl, octyl, nonyl or decyl. Examples of R are ethylene, propylene, butylene, pentylene, hexylene, octylene, i-octylene, dodecylene, tetradecylene or octadecylene. Examples of $R^6$ and $R^7$ as alkyl are methyl, ethyl, n-propyl, i-propyl, n-butyl, i-butyl, t-butyl, pentyl or hexyl.

Among the aromatic diols of the constituent (c), there come into consideration mononuclear diphenols, and particularly binuclear diphenols which carry on each aromatic nucleus a hydroxyl group. By aromatic are meant hydrocarbon-aromatic radicals, such as phenylene or naphthylene. Besides, e.g., hydroquinone, there are to be mentioned especially the bisphenols which can be represented by the following formula:

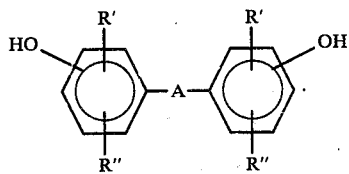

The hydroxyl groups can be in the m-position, particularly however in the p-position. R' and R'' in this formula can be alkyl having 1 to 6 C atoms, halogen such as chlorine or bromine, and especially hydrogen atoms. A can represent a direct bond, or it can represent O, S, SO$_2$, optionally substituted alkylidene, cycloalkylidene or alkylene.

Examples of optionally substituted alkylidene are: ethylidene, 1,1- or 2,2-propylidene, 2,2-butylidene, 1,1-isobutylidene, pentylidene, hexylidene, heptylidene, octylidene, dichloroethylidene and trichloroethylidene. Examples of optionally substituted alkylene are methylene, ethylene, phenylmethylene, diphenylmethylene and methylphenylmethylene. Examples of cycloalkylidene are cyclopentylidene, cyclohexylidene, cycloheptylidene and cyclooctylidene.

Examples of bisphenols are:
bis-(p-hydroxyphenyl)-ether or bis-(p-hydroxyphenyl)-thioether, bis-(p-hydroxyphenyl)-sulphone, bis-(p-hydroxyphenyl)-methane, 1,2-bis-(p-hydroxyphenyl)-ethane, 1-phenyl-bis-(p-hydroxyphenyl)-methane, diphenyl-bis-(p-hydroxyphenyl)-methane, 2,2-bis-(4'-hydroxy-3'-dimethylphenyl)-propane, 1,1- or 2,2-bis-(p-hydroxyphenyl)-butane, 1,1-dichloro- or 1,1,1-trichloro-2,2-bis-(p-hydroxyphenyl)-ethane, 1,1-bis-(p-hydroxyphenyl)-cyclopentane and, in particular, 2,2-bis-(p-hydroxyphenyl)-propane (bisphenol-A) and 1,1-bis-(p-hydroxyphenyl)-cyclohexane (bisphenol-C).

The polyesters can additionally contain aliphatic, cycloaliphatic and/or aromatic dicarboxylic acids (constituent b) incorporated by condensation, preferably at least 1 mol %, particularly 1 to 40 mol %.

Suitable dicarboxylic acids are linear and branched saturated aliphatic dicarboxylic acids, aromatic dicarboxylic acids and cycloaliphatic dicarboxylic acids.

Suitable aliphatic dicarboxylic acids are those having 4–36 C atoms, e.g. dimethylmalonic acid, succinic acid, octadecylsuccinic acid, pimelinic acid, adipic acid, trimethyladipic acid, sebacic acid, acelaic acid and dimeric acids (dimerisation products of unsaturated aliphatic carboxylic acids such as oleic acid).

Cycloaliphatic dicarboxylic acids which can be used are: 1,3-cyclobutanedicarboxylic acid, 1,3-cyclopentanedicarboxylic acid, 1,3- and 1,4-cyclohexanedicarboxylic acid, 1,3- and 1,4-dicarboxylmethylcyclohexane and 4,4'-dicyclohexyldicarboxylic acid.

Suitable aromatic dicarboxylic acids are: terephthalic acid, isophthalic acid, o-phthalic acid, 1,3-, 1,4-, 2,6- or 2,7-naphthalenedicarboxylic acid, 4,4'-diphenyldicarboxylic acid, 4,4'-diphenylsulphonedicarboxylic acid, 1,1,3-trimethyl-5-carboxyl-3-(p-carboxylphenyl)-indane, 4,4'-diphenyl ether dicarboxylic acid and bis-p-(carboxylphenyl)methane.

The aromatic dicarboxylic acids are preferred, among them particularly terephthalic acid, isophthalic acid and orthophthalic acid.

The polyesters according to the invention can also additionally contain radicals of aliphatic or cycloaliphatic diols, preferably 1 to 30 mol %, especially 1 to 20 mol %.

Suitable aliphatic diols are the aliphatic glycols, particularly those having 2 to 12, particularly 2–6, C atoms in the molecule. A suitable cycloaliphatic diol is, e.g., 1,4-dihydroxycyclohexane. Further suitable aliphatic diols are, e.g., 1,4-dihydroxymethylcyclohexane, aromatic-aliphatic diols such as p-xylene glycol or 2,5-dichloro-p-xylylene, 2,2-($\beta$-hydroxyethoxyphenyl)-propane as well as polyoxaalkylene glycol such as diethylene glycol, triethylene glycol or polyethylene glycol. The alkylenediols are preferably linear and contain in particular 2 to 4 carbon atoms.

Preferred diols are the alkylenediols, 1,4-dihydroxycyclohexane and 1,4-dihydroxymethylcyclohexane. Ethylene glycol and 1,4-butanediol are particularly preferred. Further preferred diols are those of the formula III

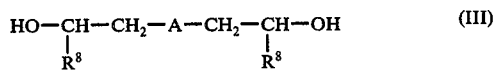

wherein $R^8$ represents methyl, ethyl and, in particular, a hydrogen atom, and A represents a radical of the formulae IIa, IIb or a hydantoin radical of the formula IIh

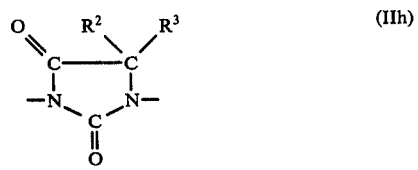

wherein $R^2$, $R^3$, Y and $m$ have the meanings already defined. These known diols are described, e.g., in the German Offenlegungsschrift No. 2,453,448. Examples are: N,N'-bis-(β-hydroxyethyl)-5,5-dimethylhydantoin, methylene-bis-[N-(β-hydroxyethyl)-5,5-dimethyl-hydantoin], N,N'-bis-(β-hydroxyethyl)benzimidazolone, N,N'-bis-(β-hydroxyethyl)-tetrachlorobenzimidazolone or N,N'-bis-(β-hydroxyethyl)-tetrabromobenzimidazolone.

If diols of the formula III are concomitantly used, then advantageously up to 30 % of dicarboxylic acid radicals of the formula I can be replaced by aromatic dicarboxylic acids, and up to 30 mol % of diols of the formula III can be contained, with the desired range of properties of the polyesters being likewise obtained.

The dicarboxylic acids of the formula I or their derivatives forming polyesters are known or are new, and can be produced by a process wherein 1 mole of the compounds of the formulae IIa to IIf, saturated on the free valencies with hydrogen atoms, (benzimidazolone, chlorinated or brominated benzimidazolone, parabanic acid, 2,2-dimethylimidazolidine-4,5-dione, barbituric acid alkylated or phenylated in the 5-position, 6-methyluracil and methylene-bishydantoin alkylated in the 5-position), or disodium or dipotassium salts thereof, is reacted with 2 moles of a ω-halogenocarboxylic acid of the formula IV, or of derivatives thereof (e.g. sodium salt or potassium salt or esters)

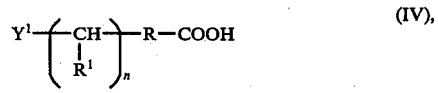

(IV), or with mixtures of compounds of the formula IV, wherein R and $R^1$ and n have the same meanings as in formula I, and $Y^1$ represents a chlorine or bromine atom, with the splitting-off of 2 moles of hydrochloric or hydrobromic acid or sodium chloride or sodium bromide or potassium chloride or potassium bromide, to give compounds of the formula I.

Halocarboxylic acids of the formula IV are known compounds and can be produced, for example, by photochlorination of alkylated benzoic acids, or by addition of HBr or HCl to singly unsaturated aliphatic monocarboxylic acids, whereby, depending on the position of the double bond in the unsaturated monocarboxylic acid and of the occurring addition mechanism (Markownikoff's rule), there are formed the corresponding halocarboxylic acids or mixtures of isomeric halocarboxylic acids.

The conversion reaction is as a rule performed in an organic solvent, with the halogen-containing compounds of the formula IV being preferably used in a slight molar excess. It is also possible to carry out the conversion reaction without solvent, that is to say, in the melt.

Solvents that can be used are, e.g.: dimethylformamide, dimethylacetamide, dimethylsulphoxide, N-methylpyrrolidone, tetramethylurea, benzene, toluene, xylene, chloroform, and mixtures of such solvents.

The reaction proceeding with the splitting-off of hydrogen halide is advantageously performed in the presence of an acid acceptor, which is added to the solvent in an amount corresponding to at least one mole-equivalent, relative to the calculated amount of hydrogen halide becoming free. Suitable acid acceptors for this purpose are, in particular, potassium carbonate, sodium carbonate and calcium carbonate or sodium bicarbonate; also sterically hindered amines such as N-methylaniline, dimethylaniline, diazabicyclooctane or also pyridine, tetramethylammonium hydroxide and alkali hydroxides and alkaline-earth hydroxides. The conversion reactions are performed in a temperature range of 20° to 200° C, preferably 50° to 150° C, with the reaction temperatures used being governed by the nature of the starting materials, by the composition of the solvent mixture and by the type of acid acceptors.

To effect the isolation of the reaction product, the reaction solution is filtered hot to remove the potassium halide formed with the use of, for example, potassium carbonate as acid acceptor; and the desired product is obtained by allowing it to crystallise out from the reaction solution, or by pouring the reaction solution into water and causing the product to precipitate, or by concentration of the reaction solution to dryness and recrystallisation of the crude product in an organic solvent. Various organic solvents are suitable for the purpose, such as methanol, acetone, ethanol or tetrahydrofuran.

If instead of the carboxylic acids of the formula IV, there are used the alkyl or phenyl esters thereof, there are correspondingly obtained the dicarboxylic acid diesters. The dicarboxylic acids of the formula I can be converted by halogenation with known halogenating agents, such as phosphorus pentachloride, into the dicarboxylic acid dichlorides.

The dicarboxylic acids of the formula I wherein X corresponds to a radical of the formula IIg are produced by processes according to the German Offenlegungsschrift No. 2,121,184.

The polyesters according to the invention can be obtained using a known method comprising polycondensing the dicarboxylic acids, or derivatives thereof forming polyesters, with at least one aromatic diol, or with derivatives thereof forming polyesters, and optionally with an aliphatic or cycloaliphatic diol, to the desired viscosity. Polycondensation is as a rule performed at temperatures of 0° to 320° C under normal pressure and in vacuo and/or in a stream of inert gas.

The known methods for producing the new polyesters are, e.g., solution or azeotropic condensation, or interfacial, melt or solid-phase condensation, and also combinations of these methods, depending on which polyester-forming derivatives and reaction catalysts are used.

As polyester-forming derivatives of dicarboxylic acids there are principally used the low-molecular dialkyl esters having 1 to 4 carbon atoms in the molecule, preferably dimethyl esters or diphenyl esters. Also suitable are the acid dihalides, particularly the acid dichlorides.

The polyesters according to the invention can be produced, for example, by esterifying or transesterifying dicarboxylic acids of the formula I, optionally together with further dicarboxylic acids, or low-molecular dialkyl esters or diphenyl esters thereof, with aromatic diols or with polyester-forming derivatives thereof, optionally with aliphatic or cycloaliphatic diols, in an inert atmosphere, e.g. in a nitrogen atmosphere, in the presence of catalysts and with simultaneous removal of the formed water, alkanol or phenol, at 150°–250° C; and subsequently performing the polycondensation at 200° to 320° C under reduced pressure in the presence of specific catalysts until the polycondensates have the viscosity desired. After removal from the reaction vessel and cooling, the polyester melt obtained is granulated or chipped in the usual manner.

This process is particularly applicable in the production of copolyesters. For producing homopolyesters, there are preferably used the diphenyl ester of the dicarboxylic acids and aromatic diols, or dicarboxylic acids and low-molecular diesters of aromatic diols, such as the diacetates.

As esterification catalysts, it is possible to use in the known manner amines, inorganic or organic acids, e.g. hydrochloric acid or p-toluenesulphonic acid, or on the other hand metals or metal compounds, which are also suitable as transesterification catalysts.

Since some catalysts accelerate preferentially the transesterification and others the polycondensation, it is advantageous to use a combination of several catalysts. Suitable transesterification catalysts are, e.g., the oxides, salts or organic compounds of the metals calcium, magnesium, zinc, cadmium, manganese, titanium and cobalt. Also the metals as such can be used as catalysts. The polycondensation is catalysed, for example, by metals such as lead, titanium, germanium and, in particular, antimony or tin, or compounds thereof. These catalysts may be added together or separately to the reaction mixture. They are added in amounts of about 0.001 to 1.0 percent by weight, relative to the acid constituent.

In producing the polyesters according to the invention, there are used particularly advantageously catalysts which accelerate both the transesterification and the polycondensation. Suitable such catalysts are, in particular, mixtures of various metals or metal compounds and also corresponding metal alloys.

Another embodiment of the process for producing the new polyesters comprises polycondensing dihalides of dicarboxylic acids of the formula I, optionally together with further dicarboxylic acid dihalides, preferably the acid dichlorides, with aromatic diols and optionally together with aliphatic or cycloaliphatic diols, in the presence of a basic catalyst, in the temperature range of 0° to 100° C, with the splitting-off of hydrogen halide. As basic catalysts are preferably used amines or quaternary ammonium salts. The proportion of the basic catalyst can be from 0.1 to 800 mol.% and more, preferably 0.1 to 100 mol %, relative to the acid halide. This procedure can be carried out without solvent or in the presence of a solvent. It can be performed in a homogeneous solution of organic solvents, or as interfacial surface condensation in a system water/organic solvent.

Polycondensation can be performed also by firstly condensing the starting compounds in the melt to give a certain viscosity; then granulating the resulting precondensate, e.g. by means of an underwater granulator; drying the granulate; optionally crystallising it with crystallising auxiliaries; and subsequently subjecting it to a solid-phase condensation, with a vacuum and temperatures below the melting point of the granulate being applied. Higher viscosities can be obtained in this manner.

In the processing of the polyester melt or even before the polycondensation reaction, there can be added to the reaction mixture inert additives of all kinds, for example fillers such as kaolin, metal powders, wollastonite and, in particular, glass fibers, inorganic or organic pigments, optical brighteners, delusterants, internal lubricants, agents promoting crystallisation and flameproofing agents.

If polycondensation is performed discontinuously, it is possible to add the inert additives already during the last condensation stages, e.g. during the solid-phase condensation, or also at the end of the melt condensation.

The polyesters according to the invention can be partially crystalline or they can be amorphous, depending on which diols and which dicarboxylic acids are used as starting constituents and in what quantity ratios these are used. They are colourless to brown-coloured, soluble in organic solvents, and constitute thermoplastic materials (engineering plastics) from which can be produced by customary moulding processes, such as casting, injection moulding and extruding, moulded articles having valuable properties. Examples of such moulded articles are technical apparatus parts, apparatus housings, domestic equipment, sports equipment, electric insultion, car components, switch gear, sheets, films, and semiproducts which can be shaped by machining. The application for the coating or articles by known powdercoating processes is also possible. Furthermore, the polyesters according to the invention are also suitable as hot melt adhesives for the production of sintered filters and the manufacture of machine parts by the sinter-forge process.

The thermal stability of the polyesters according to the invention is surprisingly high, so that with the known processing methods only slight thermal degradation is observed.

The polyesters according to the invention exhibit surprisingly high glass transition temperatures, particularly if in the dicarboxylic acids of the formula I, $R^1$ represents a hydrogen atom, $n$ is 1, R represents phenylene, and X represents a radical of the formulae IIa to IIf; or $n$ is 0, X represents a radical of the formula IIg, $R^1$ represents a hydrogen atom, and R represents phenylene or methylene or ethylene. Where R in the dicarboxylic acids of the formula I represents alkylene having 2 to 17, especially 2 to 4, C atoms, $n$ is 1, and $R^1$ represents alkyl having 1 to 10 C atoms or, in particular, a hydrogen atom, the polyesters according to the invention have a surprisingly high flexibility or low modulus of elasticity, a property which is desirable in many fields of application. The polyesters according to the invention are moreover less combustible and have surprisingly good working properties.

The polyesters produced according to the following Examples are more precisely characterised by the following characteristic values. The polyesters are characterised by those morphological changes which are measured by means of differential thermoanalysis on a specimen tempered for 3 minutes at 30° C above the melting point or softening point and then rapidly quenched. The quenched specimen is heated at a heating rate of 16° C/minute by means of the differential scanning calorimeter "DSC-1B", Perkin-Elmer. The thermogram of the specimen shows the glass transition temperature ($T_g$), the crystallisation temperature ($T_k$) and the crystallite melt temperature ($T_m$).

The point of inflection where there occurs a sudden increase in the specific heat in the thermogram is given as the glass transition temperature; the tip of the exothermal peak as the crystallisation temperature; the tip of the endothermic peak as the melting temperature; and the point at which the sudden exo- and endothermic fluctuations of the specific heat commence is given as the decomposition temperature ($T_z$). The relative viscosity of the polycondensates of the Examples is determined on solutions of 1 g of polyester in 100 ml of a mixture consisting of equal parts of phenol and symmetrical tetrachloroethane, at 30° C. The softening temperature ($T_e$) is determined on a hot-stage microscope according to Kofler with a heating-up rate of 15° C/minute, by which system a cross is formed from 2 filaments and the softening temperature is defined as being that temperature at which the sharp angles of the cross disappear.

EXAMPLE 1

Polyester formed from 1,1'-methylene-bis-[3-(p-chlorocarbonylbenzyl)-5,5-dimethylhydantoin] (I) and 2,2-bis-(4-hydroxyphenyl)-propane (II).

A solution of 8.13 g of I (0.014 mole) in 40 ml of anhydrous tetrachloroethane is added to a solution of 3.2 g of II (0.014 mole) and 7.9 g of pyridine (0.1 mole) in 30 ml of anhydrous tetrachloroethane. After 30 minutes' stirring at 25° C, the solution is heated at 50° C for a further 30 minutes and, after cooling to room temperature, stirred into 1 liter of methanol. The precipitated polyester is filtered off with suction, washed with methanol and dried at 1 mm Hg at 50° C.

There is obtained 12 g of polyester having a relative viscosity $\eta_{rel}$ = 1.81 and a glass transition temperature $T_G$ = 203° C.

EXAMPLE 2

Polyester formed from 2-diphenylamino-4,6-bis-(p-chlorocarbonylanilino)-s-triazine hydrochloride (III) and 2,2-bis-(4-hydroxyphenyl)-propane (II).

6.07 g of III (0.0103 mole) is added, with stirring, to a solution of 2.34 g of II (0.0103 mole) and 6.5 g of pyridine (0.082 mole) in 20 ml of anhydrous dichlorobenzene. After 15 minutes at room temperature, the reaction mixture is heated for 5 hours at 50° C. After the addition of 400 ml of dioxane, the reaction mixture is refluxed and, after cooling to room temperature, is stirred into 1000 ml of methanol. The polyester which has precipitated is filtered off under suction, washed with methanol and dried at 1 mm Hg at 50° C.

There is obtained 4.65 g of polyester having a relative viscosity $\eta_{rel}$ = 1.50 and a glass transition temperature $T_G$ = 253° C.

EXAMPLES 3–8

The following polyesters are produced analogously to Example 2:

| Example No. | Composition (Dicarboxylic acid + diol) | $\eta_{rel}$ | $T_G$ (° C) |
|---|---|---|---|
| 3 | III + bisphenol C | 1,27 | 259 |
| 4 | III + hydroquinone | insoluble | >315 |
| 5 | III + 4,4'-dihydroxy-diphenyl ether | 1,61 | 277 |
| 6 | III + 1,5-dihydroxy-naphthalene | 1,53 | 280 |
| 7 | III + resorcin | 1,43 | >315 |
| 8 | IV + II | 1,46 | 210 |

IV = N,N'-bis(p-chlorocarbonylbenzyl)-benzimidazolone

EXAMPLES 9 – 12

The following polyesters are produced by customary melt condensation processes:

catalyst: 0.015% of titanium tetraisopropylate (relative to the acid constituent);
polycondensation temperature: 280° C.

| Example No. | Composition (Dicarboxylic acids and diols) | Molar ratio | $\eta$rel | $T_G$ (° C) | $T_E$ (° C) |
|---|---|---|---|---|---|
| 9 | DPT + DPI + VI + BPA | 0,27:0,18: 0,05:0,5 | 1,30 | 149 | 210 |
| 10 | DPT + DPI + VI + BPA + VII | 0,27:0,18: 0,05:0,975: 0,025 | 1,33 | 152 | 200 |
| 11 | DPT + DPI + VI + BPA + V | 0,27:0,18: 0,05:0,45: 0,05 | 1,23 | 142 | 190 |
| 12 | VIII + BPA-diazetate | 0,5:0,5 | 1,54 | 98 | 150 |

DPT = diphenylterephthalate
DPI = diphenylisophthalate
BPA = bisphenol A

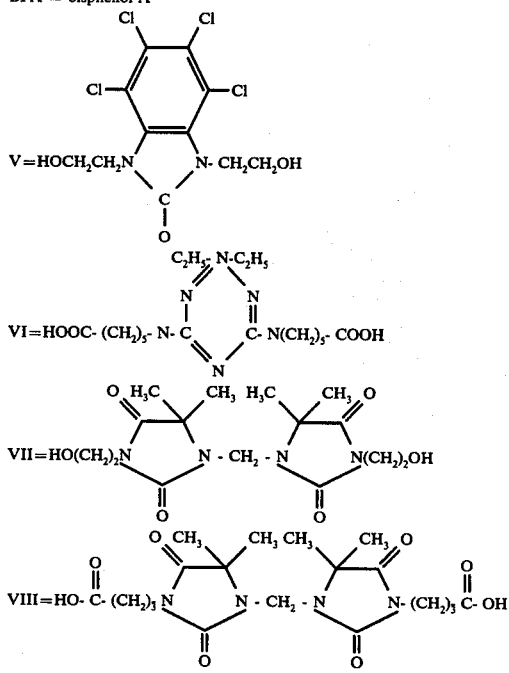

We claim:

1. A linear thermoplastic polyester, having a relative viscosity of 1.1 to 3.5, measured on a solution of 1 gram of polyester in 100 ml of a solvent consisting of equal parts of phenol and symmetrical tetrachloroethane at 30° C., which comprises the condensation product in about a 1:1 molar ratio of diacids (a) and (b) with diols (c) and (d) so that the composition of the polyester comprises in the diacid component of the polyester (a) from 1 to 50 mol %, based on the total polyester, of radicals of at least one dicarboxylic acid of the general formula I

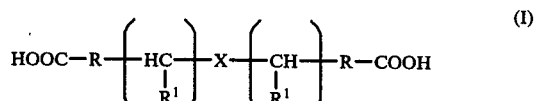

(I)

wherein $R^1$s each represent a hydrogen atom or alkyl having 1 to 10 C atoms, R represents phenylene or alkylene having 1 to 17 C atoms, and X represents a heterocyclic radical selected from the group consisting of the following formulae IIa to IIg

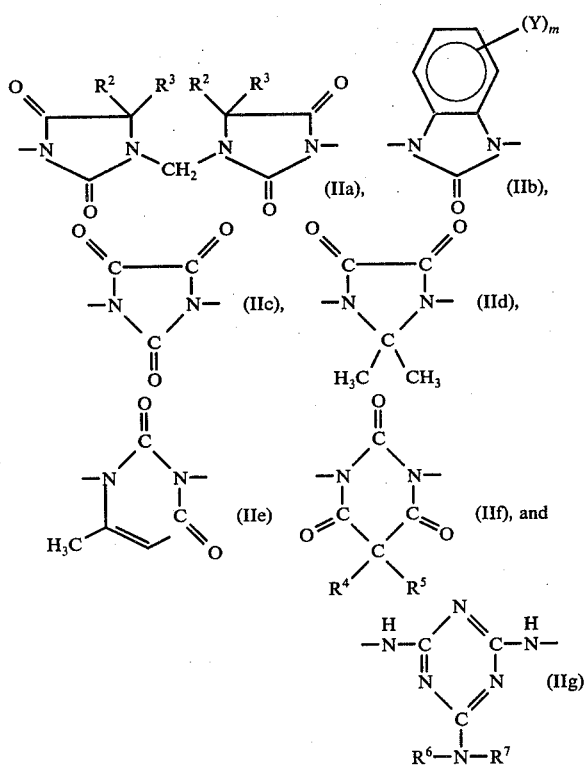

wherein $R^2$ represents a hydrogen atom, methyl or ethyl, $R^3$ represents methyl, ethyl, propyl or isopropyl, $R^4$ and $R^5$ each represent methyl, ethyl or phenyl, $R^6$ and $R^7$ each represent alkyl having 1 to 6 C atoms, cyclohexyl or phenyl, Y represents a bromine or chlorine atom, and m is naught or represents a number from 1 to 4, and n represents 1 when X is formula IIa to IIf, and n represents 0 or 1 when X is formula IIg; and (b) from 49 to 0 mol %, based on the total polyester, of radicals of at least one aromatic, cycloaliphatic or aliphatic dicarboxylic acid; and in the diol component of the polyester (c) from 20 to 50 mol %, based on the total polyester, of radicals of an aromatic diol; and (d) from 30 to 0 mol %, based on the total polyester, of radicals of an aliphatic or cycloaliphatic diol;

wherein the radicals (a) and (b) are attached to the radicals (c) and (d) through ester linkages and in a random distribution when any (b) or (d) radicals are present.

2. Polyester according to claim 1 characterized in that it comprises as (a) 10 to 50 mol % of dicarboxylic acid radicals of formula I; as (b) 40 to 0 mol % of aliphatic or aromatic dicarboxylic acid radicals; as (c) 30 to 50 mol % of radicals of an aromatic diol; and as (d) 20 to 0 mol % of radicals of an aliphatic or cycloaliphatic diol.

3. Polyester according to claim 1, characterised in that $R^1$'s each represent a hydrogen atom, and R represents linear alkylene having 1 to 4 C atoms or p-phenylene.

4. Polyester according to claim 1, characterised in that X in the formula I represents a radical of the formula IIg, and n is 1 and R is phenylene, or n is 1 and R is phenylene or alkylene.

5. Polyester according to claim 1, characterised in that X in the formula I represents a radical of the formulae IIa to IId, $R^1$ represents a hydrogen atom, and R represents linear alkylene having 1 to 4 C atoms or p-phenylene.

6. Polyester according to claim 1, characterised in that m in the formula IIb represent 0 or the number 4.

7. Polyester according to claim 1, characterised in that $R^2$ represents methyl, and $R^3$ represents methyl or ethyl, $R^4$ as well as $R^5$ represents methyl or ethyl, and $R^6$ as well as $R^7$ represents phenyl or alkyl having 1 to 4 C atoms.

8. Polyester according to claim 1, characterised in that under constituent (b) are contained terephthalic acid radicals, isophthalic acid radicals, orthophthalic acid radicals or aliphatic dicarboxylic acid radicals having 4 to 36 C atoms.

9. Polyester according to claim 1, characterised in that as aromatic diol radicals are contained 2,2-(p-hydroxyphenyl)propane radicals or 1,1-(p-hydroxyphenyl)cyclohexane radicals.

10. Polyester according to claim 1, characterised in that as aliphatic diol radicals are contained alkylene diols having 2 to 12 C atoms, cyclohexanedimethanol radicals or 2,2-($\beta$-hydroxyethoxyphenyl)-propane radicals.

11. Polyester according to claim 1, characterised in that as diol radicals having aliphatic alcohol groups are contained radicals of the formula III

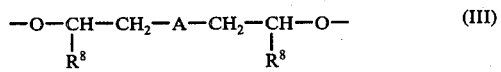

wherein $R^8$ represents methyl, ethyl or a hydrogen atom, and A represents a radical of the formulae IIa, IIb, or a hydantoin radical of the formula IIh

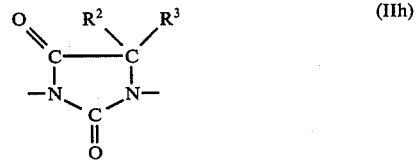

wherein $R^1$, $R^3$, Y and m have the meanings already defined in claim 1.

12. Polyester according to claim 11, characterised in that up to 30 mol % of the dicarboxylic radicals of the formula I is replaced by aromatic dicarboxylic acids, and up to 30 mol % of diols of the formula III is contained.

13. Polyester according to claim 1, characterised in that in the formula I $R^1$ represents a hydrogen atom, n is 1, R represents p-phenylene, methylene or ethylene, and X represents a radical of the formulae IIa to IIf; or n is 0, X represents a radical of the formula IIg, and R represents p-phenylene, methylene or ethylene.

14. Polyester according to claim 2 wherein (a) is 40 to 50 mol % of dicarboxylic acid radicals of formula I; (b) is 10 to 0 mol % of aliphatic or aromatic dicarboxylic acid radicals; (c) is 40 to 50 mol % of radicals of an aromatic diol, and (d) is 10 to 0 mol % of radicals of an aliphatic or cycloaliphatic diol.

15. Polyester according to claim 7 wherein $R^6$ and $R^7$ are ethyl or phenyl.

* * * * *